United States Patent
Lee et al.

(10) Patent No.: US 12,303,872 B2
(45) Date of Patent: May 20, 2025

(54) METHOD FOR MANUFACTURING RUTHENIUM OXIDE-SUPPORTED CATALYST FOR PREPARING CHLORINE AND CATALYST MANUFACTURED THEREBY

(71) Applicant: HANWHA SOLUTIONS CORPORATION, Seoul (KR)

(72) Inventors: Ga Ram Lee, Daejeon (KR); Won Yong Kim, Daejeon (KR); Eun Ji Woo, Daejeon (KR); Jeong Hwan Chun, Daejeon (KR); Young Jin Cho, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 771 days.

(21) Appl. No.: 17/416,513

(22) PCT Filed: Dec. 10, 2019

(86) PCT No.: PCT/KR2019/017378
§ 371 (c)(1),
(2) Date: Jun. 20, 2021

(87) PCT Pub. No.: WO2020/130460
PCT Pub. Date: Jun. 25, 2020

(65) Prior Publication Data
US 2022/0072513 A1    Mar. 10, 2022

(30) Foreign Application Priority Data
Dec. 21, 2018 (KR) .................. 10-2018-0167842

(51) Int. Cl.
| | |
|---|---|
| *B01J 21/04* | (2006.01) |
| *B01J 6/00* | (2006.01) |
| *B01J 21/06* | (2006.01) |
| *B01J 23/46* | (2006.01) |
| *B01J 35/50* | (2024.01) |
| *B01J 35/61* | (2024.01) |
| *B01J 37/08* | (2006.01) |
| *C01B 7/04* | (2006.01) |

(52) U.S. Cl.
CPC ............ *B01J 23/462* (2013.01); *B01J 6/001* (2013.01); *B01J 21/063* (2013.01); *B01J 35/50* (2024.01); *B01J 35/612* (2024.01); *B01J 35/613* (2024.01); *B01J 35/615* (2024.01); *B01J 37/08* (2013.01); *C01B 7/04* (2013.01)

(58) Field of Classification Search
CPC ........ B01J 21/04; B01J 21/063; B01J 23/462; B01J 35/50; B01J 35/612; B01J 35/613; B01J 3/615; B01J 37/08; B01J 6/001; C01B 7/04

USPC ................ 502/300, 325, 332, 350, 355, 415
See application file for complete search history.

(56) References Cited

U.S. PATENT DOCUMENTS

| | | | | |
|---|---|---|---|---|
| 3,766,089 A | * | 10/1973 | Pablo et al. ........... | B01J 23/462 502/514 |
| 4,210,561 A | * | 7/1980 | Antos ..................... | C10G 35/09 502/329 |
| 4,267,377 A | * | 5/1981 | Tsuji ...................... | C07C 45/70 560/256 |
| 6,852,667 B2 | * | 2/2005 | Hibi ....................... | B01J 23/462 502/325 |
| 7,704,469 B2 | * | 4/2010 | Schubert ............... | C22B 11/048 423/22 |
| 7,740,827 B2 | * | 6/2010 | Felthouse ............. | B01J 35/615 502/355 |
| 8,889,578 B2 | * | 11/2014 | Schmidt .................. | B01J 23/96 502/37 |
| 8,945,497 B2 | * | 2/2015 | Headdock ............... | B01J 23/63 502/339 |

(Continued)

FOREIGN PATENT DOCUMENTS

| | | |
|---|---|---|
| CN | 103285855 A | 9/2013 |
| CN | 105618034 A | 6/2016 |

(Continued)

*Primary Examiner* — Cam N. Nguyen
(74) *Attorney, Agent, or Firm* — Harvest IP Law, LLP

(57) ABSTRACT

The present invention relates to a method for manufacturing a ruthenium oxide-supported catalyst for preparing chlorine, and more particularly, to a method for manufacturing a catalyst and a catalyst manufactured thereby, wherein the catalyst includes a ruthenium ingredient of which a support level on an outer surface of a support is significantly improved, and the use of the catalyst in preparing chlorine can provide a high conversion rate of chlorine even at a low reaction temperature. According to an embodiment of the present invention, the method for manufacturing a ruthenium oxide-supported catalyst for preparing chlorine may include the steps of: (a) dissolving a ruthenium compound in an organic solvent to prepare a solution and supporting the same on at least one support selected from titania and alumina; (b) performing drying thereon after the supporting; and (c) performing calcining thereon after the drying. According to an embodiment of the present invention, in particular, it is possible to provide a simplified process by manufacturing a catalyst including ruthenium oxide only at each outer surface layer of a titania support without alkali pretreatment, thereby exhibiting an advantageous effect in terms of scale-up.

7 Claims, 1 Drawing Sheet

(56) References Cited

U.S. PATENT DOCUMENTS

| | | | |
|---|---|---|---|
| 2006/0094899 A1* | 5/2006 | Mizuno | B01J 37/031 568/403 |
| 2009/0274612 A1* | 11/2009 | Seki | B01J 23/8926 502/328 |
| 2010/0113260 A1* | 5/2010 | Hagemeyer | C01G 51/04 502/328 |
| 2011/0150749 A1* | 6/2011 | Seki | B01J 35/66 502/325 |
| 2011/0223096 A1* | 9/2011 | Wolf | B01J 37/06 502/200 |
| 2011/0274613 A1* | 11/2011 | Henze | B01J 23/96 502/37 |
| 2012/0027665 A1* | 2/2012 | Henze | C01B 7/04 502/328 |
| 2012/0148478 A1* | 6/2012 | Schmidt | B01J 35/66 977/773 |
| 2014/0224666 A1* | 8/2014 | Kintrup | B01J 23/462 427/126.3 |
| 2014/0248208 A1* | 9/2014 | Schmidt | B01J 35/615 423/502 |
| 2014/0335012 A1 | 11/2014 | Nishimoto | |
| 2015/0315021 A1 | 11/2015 | Nishimoto | |
| 2015/0360210 A1* | 12/2015 | Henze | B01J 38/54 502/24 |

FOREIGN PATENT DOCUMENTS

| | | |
|---|---|---|
| CN | 107617437 A | 1/2018 |
| JP | H10194705 A | 7/1998 |
| JP | 2000-254502 A | 9/2000 |
| JP | 2002292279 B2 | 10/2002 |
| JP | 2010005529 A | 1/2010 |
| JP | 5067942 B2 | 11/2012 |
| JP | 2013169516 A | 9/2013 |
| JP | 2014105128 A | 6/2014 |
| JP | 2013169516 B2 | 12/2015 |
| KR | 101561812 B1 | 9/1999 |
| KR | 19990072651 A | 9/1999 |
| KR | 1020060015311 A | 2/2006 |
| KR | 20090084949 A | 8/2009 |
| KR | 1020090084949 A | 8/2009 |
| KR | 1020130100281 A | 9/2013 |
| KR | 20140102205 A | 8/2014 |

\* cited by examiner

METHOD FOR MANUFACTURING RUTHENIUM OXIDE-SUPPORTED CATALYST FOR PREPARING CHLORINE AND CATALYST MANUFACTURED THEREBY

CROSS-REFERENCE TO RELATED APPLICATIONS

This application is a National Stage of International Application No. PCT/KR2019/017378 filed Dec. 10, 2019, claiming priority based on Korean Patent Application No. 10-2018-0167842 filed Dec. 21, 2018.

TECHNICAL FIELD

The present invention relates to a method for manufacturing a ruthenium oxide-supported catalyst for preparing chlorine, and more particularly, to a method for manufacturing a catalyst and a catalyst manufactured thereby, wherein the catalyst includes a ruthenium ingredient of which a support level on an outer surface of a support is significantly improved, and the use of the catalyst in preparing chlorine can provide a high conversion rate of chlorine even at a low reaction temperature.

BACKGROUND ART

A method for preparing chlorine by catalytic oxidation of hydrogen chloride was derived from a Deacon process, and typical catalysts include ruthenium-based catalysts, copper-based catalysts, and cerium-based catalysts. In particular, the ruthenium-based catalysts have higher activity at a lower reaction temperature with a small amount of catalyst than the copper-based catalysts or the cerium-based catalysts.

Among the above-described ruthenium-based catalysts, a ruthenium oxide-supported catalyst is useful as a catalyst for preparing chlorine by oxidizing hydrogen chloride with oxygen. Sumitomo Corporation's Korean Patent Registration No. 10-1561812, which is reported as being currently commercial, discloses a method for preparing chlorine. Korean Patent Registration No. 10-1561812 proposes a method for preparing chlorine by oxidizing hydrogen chloride by using a catalyst in which a ruthenium compound is supported on a support, a supported ruthenium oxide catalyst obtained by performing oxidation after supporting the same, a supported ruthenium oxide catalyst obtained by supporting the same and performing reduction treatment and then oxidation treatment, or a catalyst that increases activity per unit weight of ruthenium included in the catalyst by including ruthenium oxide only at each outer surface layer of the support.

However, the disclosed method has a disadvantage that a method for manufacturing a catalyst is complicated in that it requires a pre-supporting treatment of alkali in order to include ruthenium oxide only at each outer surface layer of the support.

A reaction for preparing chlorine by oxidation of hydrogen chloride is an equilibrium reaction. As a reaction temperature increases, it is disadvantageous in equilibrium and an equilibrium conversion rate decreases. Therefore, a catalyst having a lower reaction temperature is advantageous in equilibrium at the time of the reaction and a higher conversion rate of hydrogen chloride may be obtained.

However, most of the catalysts described in the related art mainly exhibit high activity at high temperature. In addition, during high-temperature operation, the performance of the catalyst decreases in a short period of several months. That is, the supported ruthenium oxide has difficulty in satisfying both conditions of thermal stability and catalyst life at the same time.

Japanese Patent Laid-Open No. 2014-105128 discloses a method for manufacturing a ruthenium oxide catalyst used for a method for preparing chlorine by oxidizing hydrogen chloride with oxygen. Alcohol is disclosed as a solvent used to support the catalyst. However, there is a limitation in that there is no description of the composition and effect of the contents that may support a ruthenium component only on an outer surface of a titania support.

Japanese Patent Laid-Open No. 2013-169516 also discloses a method for manufacturing a ruthenium oxide catalyst used for oxidation of hydrogen chloride. Alcohol is disclosed as a solvent used to support the catalyst. However, there is a limitation in that there is no description of specific contents for deriving a high chlorine conversion rate even at a low temperature of 200-300° C.

Korean Patent Application Publication No. 2014-0102205 provides a method for preparing ruthenium oxide in which ruthenium oxide and silica are supported on a titania support. However, this case also has somewhat limitation in that there is no specific description of the composition or effect that may support a ruthenium component only on an outer surface of a titania support.

Therefore, there is an urgent need a highly active catalyst that can overcome the above problems, simply uses alcohol as a solvent, simplifies a reaction process, and has a high yield even at a low reaction temperature by supporting a ruthenium component only on an outer surface of a support.

(Patent Literature 1) Japanese Patent Laid-Open No. 2014-105128 (2014 Jun. 9.)
(Patent Literature 2) Japanese Patent Laid-Open No. 2013-169516 (2015 Nov. 6.)
(Patent Literature 3) Korean Patent Application Publication No. 2014-0102205 (2014 Aug. 21.)

DESCRIPTION OF EMBODIMENTS

Technical Problem

An object of the present invention is to solve the above-described problems.

Another object of the present invention is to provide a method for manufacturing a ruthenium oxide-supported catalyst used in a process of preparing chlorine by oxidizing hydrogen chloride.

In particular, an object of the present invention is to provide a simplified process by manufacturing a catalyst including ruthenium oxide only on an outer surface of a support without alkali pretreatment.

Therefore, an object of the present invention is to provide a catalyst in which a visual measurement system (VMS) measured value (S/R) indicating a degree to which a ruthenium component is supported on an outer surface of a support is close to zero.

In addition, an object of the present invention is to provide a method for manufacturing a high-dispersion ruthenium oxide-supported catalyst having a high conversion rate of hydrogen chloride at a low reaction temperature, preferably about 250° C., in a process of preparing chlorine, and a ruthenium oxide-supported catalyst manufactured thereby.

Solution to Problem

In order to achieve the above-described objects of the present invention and achieve the characteristic effects of the present invention described below, the characteristic construction of the present invention is as follows.

According to an embodiment of the present invention, a method for manufacturing a ruthenium oxide-supported catalyst for preparing chlorine includes the steps of: (a) dissolving a ruthenium compound in an organic solvent to prepare a solution and supporting the same on at least one support selected from titania and alumina; (b) performing drying thereon after the supporting; and (c) performing calcining thereon after the drying.

According to an embodiment of the present invention, the ruthenium oxide-supported catalyst may include 70-80 parts by weight of the support, 5 parts by weight or less of the ruthenium compound, and 15-25 parts by weight of the organic solvent, based on 100 parts by weight of the total supported catalyst before the drying.

The organic solvent in the step (a) may be monoalcohol, and preferably a primary alcohol of C3 or higher. The organic solvent may be 1-propanol. However, the present invention is not limited thereto.

According to an embodiment of the present invention, the titanium support in the step (a) may have a specific surface area of 5-300 $m^2/g$, and preferably 5-100 $m^2/g$. However, the present invention is not limited thereto.

In addition, the drying in the step (b) may be performed for 3-5 hours in an air condition of 80-120° C. After the drying, the ruthenium oxide may be included in an amount of 5 parts by weight or less based on 100 parts by weight of the total catalyst. Preferably, the ruthenium oxide may be included in an amount of 2 parts by weight.

The calcining in the step (c) may be performed at 300-400° C. for 2-4 hours.

According to an embodiment of the present invention, a method for manufacturing a ruthenium oxide-supported catalyst for preparing chlorine includes the steps of: preparing a mixture by nixing a powder support mixture including at least one selected from titania and alumina, titania or alumina sol, an organic binder, and distilled water; extruding the mixture; performing drying and cutting the extruded mixture into a molded body; and performing calcining. In addition, in this case, the support may include 30-50 parts by weight of the powder support mixture, 1-9 parts by weight of the titania or alumina sol, 0.5-1.5 parts by weight of the organic binder, and 20-40 parts by weight of the distilled water, based on 100 parts by weight of the total support before the drying.

According to an embodiment of the present invention, a ruthenium oxide-supported catalyst manufactured by the above-described method may be provided. Chlorine may be removed from the manufactured catalyst by oxidizing hydrogen chloride.

The ruthenium oxide-supported catalyst may be at least one selected from a powder form, a particle form, and a pellet form. Preferably, the ruthenium oxide-supported catalyst may be provided in the pellet form. In addition, the ruthenium oxide-supported catalyst may have a visual measurement system (VMS) measured value (S/R) of 0.5 or less.

According to an embodiment of the present invention, a method for preparing chlorine through oxidation of hydrogen chloride in the presence of the catalyst is provided. A reaction temperature for chlorine preparation may be 200-300° C., and preferably 250° C.

Advantageous Effects of Disclosure

There is an effect of providing a catalyst used to prepare chlorine according to the oxidation of hydrogen chloride according to the present invention.

According to an embodiment of the present invention, in particular, it is possible to provide a simplified process by manufacturing a catalyst including ruthenium oxide only at each outer surface layer of a titania support without alkali pretreatment, thereby exhibiting an advantageous effect in terms of scale-up.

In particular, there is an effect of providing a catalyst having an S/R value close to 0, the S/R value being measured through visual measurement system (VMS) and indicating a degree to which a ruthenium component is supported on an outer surface of a support.

According to an embodiment of the present invention, there is an effect of providing a method for manufacturing a high-dispersion ruthenium oxide-supported catalyst having a high conversion rate of hydrogen chloride at a low reaction temperature, preferably about 250° C., in a process of preparing chlorine.

BEST MODE

Figure 1:
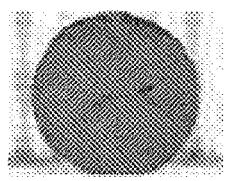
FIG. 1 illustrates the outer surface supporting degree result when deionized water is used as the solvent.

The present invention will be described with reference to specific embodiments and the accompanying drawings. The embodiments will be described in detail in such a manner that the present invention may be carried out by those of ordinary skill in the art. It should be understood that various embodiments of the present invention are different, but need not be mutually exclusive. For example, certain shapes, structures, and features described herein may be implemented in other embodiments without departing from the spirit and scope of the present invention in connection with one embodiment. In addition, it should be understood that the locations or arrangement of individual components in the embodiments can be changed without departing from the spirit and scope of the present invention. Therefore, the following detailed description is not to be taken in a limiting sense, and the scope of the present invention is to be limited only by the appended claims and the entire scope of equivalents thereof, if properly explained.

Hereinafter, embodiments of the present invention will be described with reference to the accompanying drawings, so that those of ordinary skill in the art can easily carry out the present invention.

According to an embodiment of the present invention, provided is a method for manufacturing a ruthenium oxide-supported catalyst for preparing chlorine, the method including the steps of: (a) dissolving a ruthenium compound in an organic solvent to prepare a solution and supporting the same on at least one support selected from titania and alumina; (b) performing drying thereon; and (c) performing calcining thereon.

Unlike known techniques, in the case of the catalyst according to the present invention, alkali pretreatment is not required to include a ruthenium oxide component only at each outer surface layer of a titania support. Therefore, the catalyst may be simply manufactured through three steps: supporting, drying, and calcining. Therefore, it is possible to provide an advantage in terms of future scale-up through the simplified manufacturing method while maintaining high activity of the catalyst. This may provide an advantageous effect in terms of time and cost in the manufacturing process.

According to an embodiment of the present invention, the ruthenium oxide-supported catalyst may include 70-80 parts by weight of the support, 5 parts by weight or less of the ruthenium compound, and 15-25 parts by weight of the organic solvent, based on 100 parts by weight of the total catalyst before the drying.

In particular, the ruthenium oxide is included in an amount of 5 parts by weight or less in the catalyst finally manufactured after the drying and calcining step. The ruthenium oxide may be included in an amount of preferably 2-4 parts by weight, and most preferably 2 parts by weight.

As the support, the titania support may include anatase-type titania, rutile-type titania, amorphous titania, or any mixture thereof.

In addition, the titania support may include an oxide such as alumina, zirconia, or niobium oxide. According to an embodiment of the present invention, a rutile-type titania is preferably provided.

The specific surface area of the titania support may be measured by a commonly used BET method, and the specific surface area is 5-300 $m^2/g$, and preferably 5-100 $m^2/g$. When the specific surface area is greater than the above range, it may be difficult to secure the thermal stability of ruthenium oxide, and when the specific surface area is less than the above range, high dispersion is difficult and the activity of the catalyst is also lowered.

In the case of the alumina support, alpha-alumina is preferably provided. Alpha-alumina has high thermal conductivity, which helps to secure thermal stability during reaction operation, and has a low BET specific surface area. Therefore, preferably, the absorption of other impurities hardly occurs.

According to an embodiment of the present invention, the ruthenium compound may exist in the form of a complex salt and may include metal salts such as halide, halogenoate, oxoate, oxyhalide, and chloride. For example, the ruthenium compound may include $RuCl_3$, $RuBr_3$, $K_3RuCl_6$, $K_2RuCl_6$, $K_2RuO_4$, $Na_2RuO_4$, $Ru_2OCH_4$, $Ru_2OCl_5$, $Ru_2OCl_6$, and the like, but the present invention is not limited thereto.

According to an embodiment of the present invention, the ruthenium compound is preferably a halide, and most preferably a ruthenium chloride including chloride. In some cases, as the ruthenium compound, a hydrate of a ruthenium compound may be provided, and two or more selected from the ruthenium compounds may be provided.

Ruthenium chloride may be used in a powder form and mixed in a solvent, and a solid support may be suspended in the solvent to form a precipitate and may be deposited on the solid support. The supporting includes impregnation or immersion. In this case, the temperature is usually 0-100° C., and preferably 0-50° C., and the pressure is usually 0.1-1 MPa, and preferably atmospheric pressure. The supporting may be performed under an air atmosphere or an inert gas atmosphere such as nitrogen, helium, argon, and oxygen dioxide. In this case, water vapor may be included. The supporting is preferably performed under the inert gas atmosphere, but the present invention is not limited thereto.

The organic solvent in the step (a) may be monoalcohol, and a primary alcohol of C3 or higher is provided. Preferably, 1-propanol is provided. According to the present invention, an alcohol solvent is provided as the solvent in place of high-purity water such as distilled water, ion-exchanged water, or deionized water, compared with the known techniques.

According to an embodiment of the present invention, a C3 alcohol-based organic solvent is preferably provided. 1-propanol is preferably provided. By using high wettability and hydrophobicity of the solution, the ruthenium component may be supported only on the outer surface of the titanium oxide molded support with a hydroxy group. The degree of dispersion of ruthenium supported on the surface of the titanium oxide molded support or a powder support may be increased.

That is, a highly active catalyst may be provided by using the hydrophobicity and wettability of C3 alcohol. In particular, compared with the outer surface supporting degree of the catalyst supported using deionized water or ethanol and the catalyst performance, the catalyst supported using propanol, which is an alcohol solvent, has a high outer surface supporting degree and provides high initial activity.

In order to provide such an effect, the present invention provides the derivation of results through the following visual measurement system (VMS).

The degree to which the ruthenium component is supported on the outer surface of the support is expressed by the following equation. The outer surface supporting degree of the ruthenium component was measured through VMS. As the number in the following equation is closer to 0, the outer surface supporting degree increases.

$$S/R \qquad \text{[Equation 1]}$$

R: Distance from the outermost point (A) of the horizontal cross-section (circle) of the cylindrical catalyst to the center of the same horizontal cross-section S: Distance measured on the straight line from the point (A) to the center of the same horizontal cross-section, and distance from the point (A) to the point (B) where the ruthenium oxide component disappears.

In the method for manufacturing the catalyst and the catalyst manufactured thereby according to the present invention, in view of the measured result of the outer surface supporting degree (S/R) result value in Table 3, when 1-propanol is used, the outer surface supporting degree is close to 0, compared with the case in which deionized water is used as the solvent. Therefore, in the case of the catalyst according to the present invention, the ruthenium component may be supported only on the outer surface of the titanium oxide support in which hydroxy is present.

Furthermore, since the catalyst is manufactured through three steps, that is, supporting, drying, and calcining, the manufacturing method can be simplified and a scale-up effect can also be provided.

The drying in the step (b) may be performed for 3-5 hours in an air condition of 80-120° C. The drying may be performed while rotating and stirring. The drying may be performed while vibrating a drying container or using a stirrer provided in the container, but the present invention is not limited thereto. A drying temperature is usually room temperature to about 100° C., and a pressure is usually 0.1-1 MPa, and preferably atmospheric pressure.

After the drying step, ruthenium oxide may be included in an amount of 5 parts by weight or less based on 100 parts by weight of the total catalyst after the drying. Preferably, ruthenium oxide may be included in an amount of 2 parts by weight.

The calcining in the step (c) may be performed at 300-400° C. for 2-4 hours. After that, cooling to room temperature may be performed. A calcining temperature is a temperature that is usually applied, and preferably 250-450° C. Examples of oxidizing gas may include oxygen-containing gas. An oxygen concentration is 1-30 vol %, which is a usually applied oxygen concentration. As an oxygen source, air or pure oxygen is generally provided. As necessary, an inert gas or water vapor may be included. The oxidizing gas may be preferably air. After calcining at about 350° C. for about 3 hours in an electric furnace under the flow of air, cooling may be performed to room temperature and a ruthenium oxide catalyst may be finally manufactured.

As described above, according to an embodiment of the present invention, it is possible to manufacture supported ruthenium oxide in which ruthenium oxide is supported on at least one support selected from titania and alumina. In this case, the oxidation number of ruthenium is usually 4, and ruthenium dioxide ($RuO_2$) is provided. However, the oxidation number and form are not limited thereto.

According to an embodiment of the present invention, the support is prepared by the following method.

The support may be prepared by preparing a mixture by mixing at least one powder support mixture selected from titania and alumina, titania or alumina sol, an organic binder, and distilled water; extruding the mixture; performing drying and cutting the extruded mixture into a molded body; and performing calcining.

The support may include 30-50 parts by weight of the powder support mixture, 1-9 parts by weight of the titania or alumina sol, 0.5-1.5 parts by weight of the organic binder, and 20-40 parts by weight of the distilled water, based on 100 parts by weight of the total support before drying.

This is mixed, extruded into noodle-shaped strands having a diameter of 2-3 mm, dried, and molded. At this time, the drying is performed at 50-70° C. for 1-3 hours. The cutting is then performed into the molded body having a length of 2-4 mm. In this case, the calcining is performed at 400-800° C. for 2-4 hours in an air condition. Detailed conditions for drying and calcining are omitted because the above-described conditions for the drying and calcining of the catalyst are generally applicable.

According to an embodiment of the present invention, in order to manufacture the final ruthenium oxide-supported catalyst, the finally optimized ruthenium oxide-supported catalyst may be provided by applying the support prepared by the above-described method for preparing the support that satisfies the particle size, size distribution, surface area, and pore structure suitable for the ruthenium catalyst composition.

According to an embodiment of the present invention, the ruthenium oxide-supported catalyst may oxidize hydrogen chloride to produce chlorine. In this case, the ruthenium oxide-supported catalyst manufactured by the above-described manufacturing method may be used.

The ruthenium oxide-supported catalyst may be at least one selected from powder, particle, and pellet forms. The ruthenium oxide-supported catalyst is preferably the pellet or powder form, and most preferably the pellet form. The diameter is preferably 5 mm or less. When the diameter of the molded body is excessively large, it may provide a disadvantage in the activity of the catalyst.

According to an embodiment of the present invention, the ruthenium oxide-supported catalyst has a VMS measured value (S/R) of 0.5 or less. Therefore, high activity may be provided even under temperature conditions in a chlorine preparation reaction described below.

According to an embodiment of the present invention, a method for preparing chlorine through oxidation of hydrogen chloride in the presence of the catalyst manufactured by any one of the above-described manufacturing methods is provided. A reaction method includes a stationary phase method, a fluidized bed method, a gas phase reaction, and the like. The reaction method is preferably the gas phase reaction. This oxidation reaction is an equilibrium reaction. When the oxidation reaction is performed at excessively high temperature, an equilibrium conversion rate decreases. Thus, the oxidation reaction is preferably performed at a relatively low temperature. The reaction temperature is usually 100-500° C., preferably 200-450° C., and most preferably 250° C. In addition, the reaction pressure is usually about 0.1-5 MPa. As the oxygen source, air or pure oxygen may be used. A theoretical molar amount of oxygen to hydrogen chloride is ¼ mol, but 0.1-10 times the amount of oxygen is usually provided. In addition, the supply rate of hydrogen chloride is expressed by the gas supply rate per 1 L of catalyst (L/h; 0° C., converted to 1 atmosphere), that is, GHSV, and is usually about 10-20,000 $h^{-1}$. However, the amount of catalyst added at this time may be slightly modified depending on the temperature, the amount of catalyst, and the amount of the prepared chlorine product.

Hereinafter, the structure and operation of the present invention will be described in more detail with reference to preferred examples of the present invention. However, these example are shown by way of illustration and should not be construed as limiting the present invention in any way.

Since contents not described herein can be sufficiently technically inferred by those of ordinary skill in the art, descriptions thereof will be omitted.

Example 1

<Manufacturing of Support>

40.0 g of titania powder, 0.8 g of an organic binder, 29.0 g of deionized water heated to 60° C., and 5.0 g of titania sol were mixed. The obtained mixture was extruded into noodle-shaped strands having a diameter of 2.0 mmφ, dried for 2 hours at 60° C. in air, and cut into a molded body having a length of 2-4 mm. The obtained molded body was calcined in air at 600° C. for 3 hours.

<Manufacturing of Ruthenium Oxide-Supported Catalyst>

A solution prepared by dissolving 0.2 g of ruthenium chloride hydrate in 1.33 g of 1-propanol was impregnated in 5.0 g of the obtained titania support and dried for 4 hours at 100° C. in air. The dried solid was calcined at 350° C. for 3 hours in an electric furnace under air flow and gradually cooled to room temperature to finally obtain a ruthenium oxide catalyst in which ruthenium oxide was included in an amount of 2.0 parts by weight. In addition, the outer surface supporting degree of the ruthenium component measured by VMS was 0.32.

<Evaluation of Initial Activity of Ruthenium Oxide-Supported Catalyst>

0.3 g of the obtained ruthenium oxide-supported catalyst was diluted with 1.5 g of an a-alumina ball having a diameter of 2 mm and charged into a quartz reaction tube (inner diameter: 8 mm). A catalyst layer was heated to a temperature of 300° C. in the reaction tube, and a reaction was performed while hydrogen chloride and oxygen gas were supplied under normal pressure at a rate of 22.5 mL/min. After 2 hours from the start of the reaction, the gas at the outlet of the reaction tube was passed through a 15% aqueous potassium iodide solution to perform sampling for 10 minutes. Next, the amount of chlorine prepared was measured by an iodine titration method, and the conversion rate of hydrogen chloride was calculated by Equation 2 below. Results thereof are shown in Table 1.

Conversion rate(%) = [Equation 2]

$$\text{Conversion rate}(\%) = \frac{2 \times (\text{amount of chlorine gas generated})(\text{mmol})}{(\text{amount of hydrogen chloride gas before reaction})(\text{mmol})} \times 100$$

Example 2

The initial activity evaluation was performed on Example 2 in the same manner as in Example 1, except that the temperature of the catalyst layer with respect to the catalyst obtained in Example 1 was 283° C. Results thereof are shown in Table 1.

Example 3

A solution prepared by dissolving 0.067 g of ruthenium chloride hydrate in 0.44 g of 1-propanol was impregnated in 5.0 g of the support obtained in Example 1 and dried for 4 hours at 100° C. in air. The supporting method was repeated three times. The dried solid was calcined at 350° C. for 3 hours in an electric furnace under air flow and gradually cooled to room temperature to finally obtain a ruthenium oxide catalyst in which ruthenium oxide was included in an amount of 2.0 parts by weight. In addition, the outer surface supporting degree of the ruthenium component measured by VMS was 1.

The initial activity evaluation was performed in the same manner as in Example 1. Results thereof are shown in Table 1.

Example 4

<Manufacturing of Ruthenium Oxide-Supported Catalyst>

A solution prepared by dissolving 0.2 g of ruthenium chloride hydrate in 1.05 g of 1-propanol was impregnated in 5.0 g of a titania powder and dried for 4 hours at 100° C. in air. The dried solid was calcined at 350° C. for 3 hours in an electric furnace in air and gradually cooled to room temperature to finally obtain a ruthenium oxide catalyst in which ruthenium oxide was included in an amount of 2.0 parts by weight.

<Evaluation of Initial Activity of Ruthenium Oxide-Supported Catalyst>

0.3 g of the obtained ruthenium oxide-supported catalyst was diluted with 0.6 g of a titania powder and charged into a quartz reaction tube (inner diameter: 8 mm). A catalyst layer was heated to a temperature of 250° C. in the reaction tube, and a reaction was performed while hydrogen chloride and oxygen gas were supplied under normal pressure at a rate of 22.5 mL/min. After 2 hours from the start of the reaction, the gas at the outlet of the reaction tube was passed through a 15% aqueous potassium iodide solution to perform sampling for 10 minutes. Next, the amount of chlorine prepared was measured by an iodine titration method, and the conversion rate of hydrogen chloride was calculated. Results thereof are shown in Table 2.

Comparative Example 1

A ruthenium oxide-supported catalyst was manufactured in the same manner as in Example 1, except that an aqueous solution prepared by dissolving 0.2 g of ruthenium chloride hydrate in 1.65 g of deionized water was used. The outer surface supporting degree of the ruthenium component measured by VMS was 1. The initial activity evaluation was performed on the obtained ruthenium oxide-supported catalyst in the same manner as in Example 1. Results thereof are shown in Table 1.

Comparative Example 2

A ruthenium oxide-supported catalyst was manufactured in the same manner as in Example 4, except that an aqueous solution prepared by dissolving 0.2 g of ruthenium chloride hydrate in 1.3 g of deionized water was used. The initial activity evaluation was performed on the obtained ruthenium oxide-supported catalyst in the same manner as in Example 4. Results thereof are shown in Table 2.

Comparative Example 3

A ruthenium oxide-supported catalyst was manufactured in the same manner as in Example 1, except that a solution prepared by dissolving 0.2 g of ruthenium chloride hydrate in 1.3 g of ethanol was used. The outer surface supporting degree of the ruthenium component measured by VMS was 0.41. The initial activity evaluation was performed on the obtained ruthenium oxide-supported catalyst in the same manner as in Example 1. Results thereof are shown in Table 1.

TABLE 1

| | Solvent | Catalyst type | S/R | Catalyst layer temperature (° C.) | Hydrogen chloride conversion rate (%) |
|---|---|---|---|---|---|
| Example 1 | 1-propanol | Pellet | 0.32 | 300 | 37.0 |
| Example 2 | 1-propanol | Pellet | 0.32 | 283 | 23.2 |
| Example 3 | 1-propanol | Pellet | 1 | 300 | 29.8 |
| Comparative Example 1 | Deionized water | Pellet | 1 | 300 | 21.7 |
| Comparative Example 3 | ethanol | Pellet | 0.41 | 300 | 26.7 |

TABLE 2

| | Solvent | Catalyst type | S/R | Catalyst layer temperature (° C.) | Hydrogen chloride conversion rate (%) |
|---|---|---|---|---|---|
| Example 4 | 1-propanol | Powder | — | 250 | 16.4 |
| Comparative Example 2 | Deionized water | Powder | — | 250 | 8.9 |

TABLE 3

Figure 2:
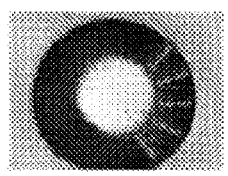
FIG. 2 illustrates the outer surface supporting degree result when ethanol is used as the solvent.
Figure 3:
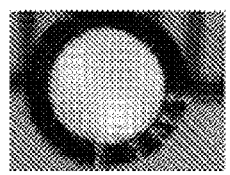
FIG. 3 illustrates the outer surface supporting degree result when 1-propanol is used as the solvent.

| | Solvent used | | |
|---|---|---|---|
| | Deionized water (Comparative Example 1) See FIG. 1 | Ethanol (Comparative Example 3) See FIG. 2 | 1-propanol (Examples 1 and 2) See FIG. 3 |
| Outer surface supporting degree (S/R) | 1 | 0.41 | 0.32 |

In the case of Examples 1 to 4 in which the solvent was supported using propanol by changing the supporting method, the outer surface supporting degree (S/R) value was so remarkable low as closer to 0, compared with the catalysts of Comparative Examples 1 to 3 that were supported using deionized water or ethanol. In addition, it can be confirmed that the conversion rate also improved as the outer surface supporting degree (S/R) value decreased.

Therefore, it can be confirmed that the catalyst according to the present invention is the ruthenium oxide-supported catalyst manufactured using the alcoholic organic solvent such as 1-propanol, the catalyst including ruthenium oxide only at each outer surface layer of the pellet-shaped titania support can be provided through a simplified process, and the catalyst having high activity with a high hydrogen chloride conversion rate can be provided even at a low reaction temperature, preferably around 250° C., in the chlorine preparation process. This can provide an advantage in terms of scale-up in a process of manufacturing a catalyst in the future.

While the present invention has been described by particular matters such as specific components and limited embodiments and drawings, this is provided only for helping the comprehensive understanding of the present invention. The present invention is not limited to the above-described embodiments, and it will be understood by those of ordinary skill in the art that various modifications and variations can be made thereto without departing from the scope of the present invention.

Therefore, it will be understood that the spirit of the present invention should not be limited to the above-described embodiments and the claims and all equivalent modifications fall within the scope of the present invention.

The invention claimed is:

1. A method for manufacturing a ruthenium oxide-supported catalyst for preparing chlorine, wherein the ruthenium oxide-supported catalyst has a visual measurement system (VMS) measured value (S/R) of 0.5 or less, the method comprising the steps of:
    (a) dissolving a ruthenium compound in an organic solvent to prepare a solution and supporting said solution on at least one support selected from titania and alumina, wherein the organic solvent is 1-propanol;
    (b) drying after the supporting; and
    (c) calcining after the drying.

2. The method of claim 1, wherein the titania support in the step (a) has a specific surface area of 5-300 $m^2/g$.

3. The method of claim 1, wherein the drying in the step (b) is performed for 3-5 hours in an air condition of 80-120° C.

4. The method of claim 1, wherein the ruthenium oxide is included in an amount of 5 parts by weight or less based on 100 parts by weight of the total catalyst after the step (c).

5. The method of claim 1, wherein the calcining in the step (c) is performed at 300-400° C. for 2-4 hours.

6. The method of claim 1, wherein the ruthenium oxide-supported catalyst oxidizes hydrogen chloride to prepare chlorine.

7. The method of claim 1, wherein the ruthenium oxide-supported catalyst includes 70-80 parts by weight of the support, 5 parts by weight or less of the ruthenium compound, and 15-25 parts by weight of the organic solvent, based on 100 parts by weight of the total supported catalyst before the drying.

* * * * *